United States Patent [19]
Echigoya

[11] Patent Number: 5,947,374
[45] Date of Patent: Sep. 7, 1999

[54] METHOD AND APPARATUS FOR CONTROLLING VEHICULAR FUEL-COMBUSTION HEATER

[75] Inventor: Hiroshi Echigoya, Utsunomiya, Japan

[73] Assignee: Honda Giken Kogyo Kabushiki Kaisha, Tokyo, Japan

[21] Appl. No.: 09/069,149

[22] Filed: Apr. 29, 1998

[30] Foreign Application Priority Data

Apr. 30, 1997 [JP] Japan ................................. 9-112084

[51] Int. Cl.$^6$ ....................................................... F24D 3/00
[52] U.S. Cl. ................................... 237/8 A; 237/12.3 R
[58] Field of Search ..................... 237/12.3 C, 12.3 R, 237/8 A

[56] References Cited

FOREIGN PATENT DOCUMENTS 8-197937  8/1996  Japan.

*Primary Examiner*—Henry Bennet
*Assistant Examiner*—Derek S. Boles
*Attorney, Agent, or Firm*—Birch, Stewart, Kolasch & Birch, LLP

[57] ABSTRACT

Disclosed is a system for controlling a vehicular fuel-combustion heater, comprising an environmental condition input unit for inputting environmental conditions including an ambient air temperature; an operation start-judging unit for judging whether or not the inputted ambient air temperature is lower than a previously set first reference temperature, and starting operation of the fuel-combustion heater when the inputted ambient air temperature is lower than the first reference temperature; and a reference temperature-changing unit for setting, for the first reference temperature, a second reference temperature which is lower than the first reference temperature when the fuel-combustion heater is operated for the second time or later.

14 Claims, 10 Drawing Sheets

METHOD AND APPARATUS FOR CONTROLLING VEHICULAR FUEL-COMBUSTION HEATER

BACKGROUND OF THE INVENTION

1. Field of the Invention

The present invention relates to a method and an apparatus for controlling a fuel-combustion heater for heating a heating medium with combustion heat generated thereby, the fuel-combustion heater being incorporated into a heating medium circuit for heating air by means of heat exchange effected between the heating medium and the air flowing through a duct including a heat exchanger disposed therein and having an air outlet which is openable into a passenger's compartment.

2. Description of the Related Art

Air-conditioning systems for use, for example, on electric vehicles cannot use a heating medium in the form of cooling water which would otherwise be heated by cooling internal combustion engines. For this reason, for example, a vehicular air-conditioning system is known, which is disclosed in Japanese laid-open patent publication No. 8-197937.

The air-conditioning system has a duct for passing air therethrough into a passenger's compartment, wherein the air-conditioning system operates selectively in a refrigerating cycle which involves an air blower for delivering air through the duct into the passenger's compartment, a coolant compressor for compressing and discharging a coolant, a coolant-water heat exchanger for heating hot water through heat exchange between the compressed coolant at a high temperature discharged from the coolant compressor and the hot water, and a coolant evaporator for cooling air with the heat of evaporation of the coolant, and in a hot-water cycle which involves a pump for circulating the hot water heated by the coolant-water heat exchanger and a hot-water heater disposed in the duct for heating air flowing through the duct with the hot water flowing from the coolant-water heat exchanger. The hot-water cycle also involves a fuel-combustion heater, connected in series with the hot-water heater, for heating the hot water with heat generated when a fuel is combusted, in order to obtain a sufficient heating capability, for example, in cold climates.

In the case of such an air-conditioning system, it is known that frost is apt to be formed on the coolant-water heat exchanger when the ambient air temperature is low (not more than 0° C.), and the heat pump cycle effected by the pump suffers decrease in heating ability, in which the heating operation is performed only when the temperature is about −10° C. Therefore, it is desirable that the heating operation for air-conditioning is performed by using the fuel-combustion heater, in a region in which the ambient air temperature is low. In such a case, it is appropriate that the ambient air temperature for starting operation of the fuel-combustion heater is set in the vicinity of −10° C.

When the fuel-combustion heater is used, sufficient heating for air-conditioning is performed without using any heat pump cycle. Therefore, it is possible to achieve energy-saving. On the other hand, for example, the legislation of California in the United States involves the regulation of zero-emission at 4.4° C. or higher temperatures. Therefore, the temperature to start operation of the fuel-combustion heater is generally set within a range of 0° C. to 3° C.

However, in the case of the conventional air-conditioning system described above, the operation to switch on and off the fuel-combustion heater is automatically controlled on the basis of a predetermined ambient air temperature. Therefore, when the ambient air temperature is markedly changed in the vicinity of the ambient air temperature setting to start operation of the fuel-combustion heater, the on/off operation of the fuel-combustion heater is frequently performed. As a result, inconveniences arise, for example, in that the unburned gas is produced from the fuel-combustion heater, and the noise is frequently made upon starting and extinguishment of the fuel-combustion heater.

Further, the operation to switch on and off the fuel-combustion heater is performed regardless of the intention of the passenger. Therefore, the conventional air-conditioning system is not applicable to a case in which it is intended not to produce the exhaust gas, for example, a case in which it is intended to avoid pollution by the exhaust gas, such as in a garage. A problem is also pointed out for the conventional air-conditioning system that it is difficult to drive the vehicle in the zero-emission area.

SUMMARY OF THE INVENTION

A principal object of the present invention is to provide a method and an apparatus for controlling a vehicular fuel-combustion heater which makes it possible to reliably avoid frequent on/off operation of the fuel-combustion heater and arbitrarily switch off the fuel-combustion heater.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
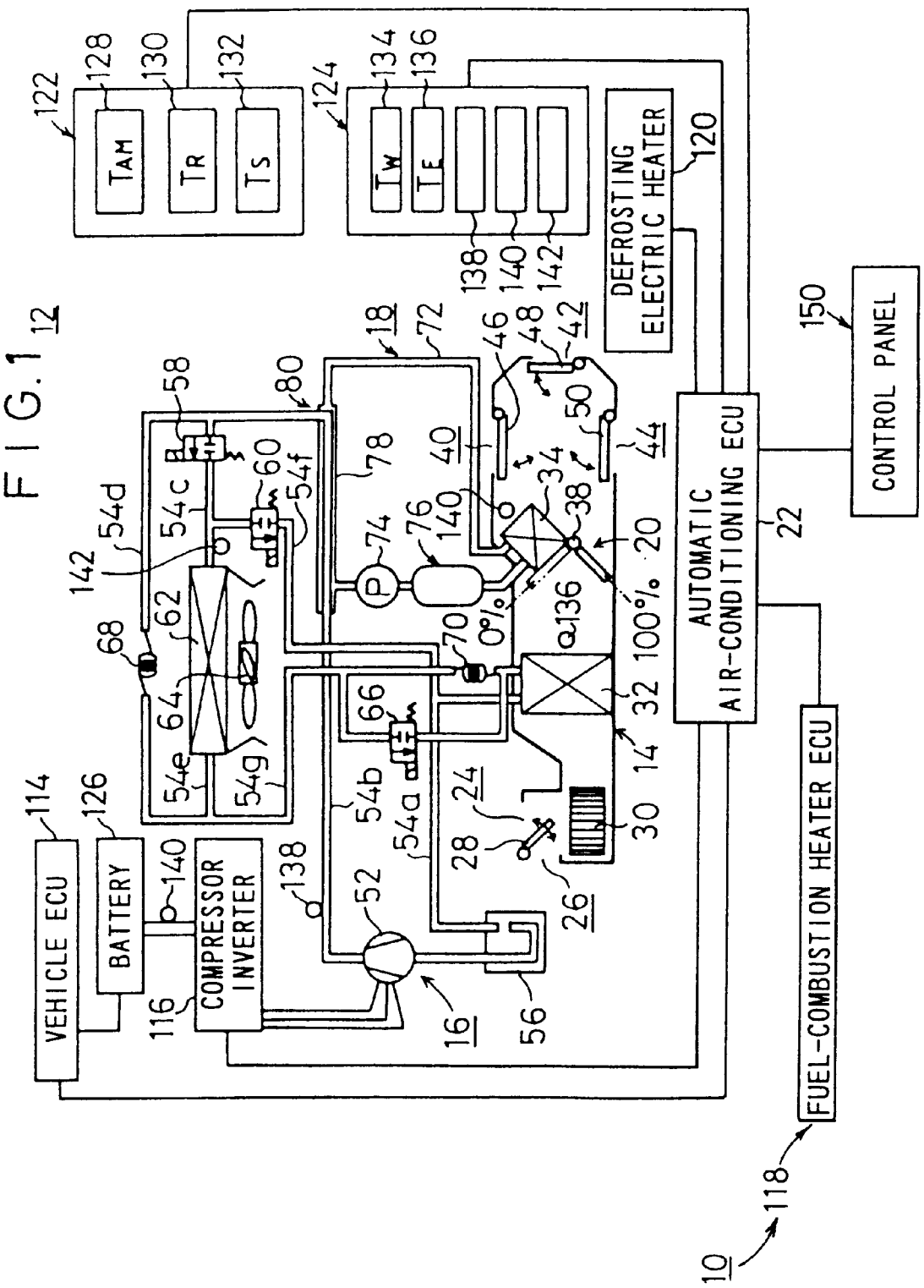
FIG. 1 is a schematic view, partly in block form, of an automatic air-conditioning system for use on an electric vehicle, to which a control apparatus according to the present invention is applied.

FIG. 1 schematically shows, partly in block form, an automatic air-conditioning system 12 for use on an electric vehicle, to which a control apparatus 10 according to the present invention is applied.

As shown in FIG. 1, the automatic air-conditioning system 12 has a duct 14 for discharging temperature-controlled and humidity-controlled air into the passenger's compartment of the electric vehicle, a cooling medium circuit 16 for cooling the air flowing through the duct 14 through heat exchange between the air and a coolant, a heating medium circuit 18 for heating the air flowing through the duct 14 through heat exchange between the air and hot water, an air-mixing unit 20 disposed in the duct 14 for mixing and controlling cool air and hot air, and an automatic air-conditioning ECU 22 for controlling operation of various units including the air-mixing unit 20.

The duct 14 is disposed in front of the passenger's compartment with an instrument panel (not shown) interposed therebetween. The duct 14 has on its upstream end an interior air inlet 24 for introducing air from an interior space in the passenger's compartment and an exterior air inlet 26 for introducing from an exterior space outside of the passenger's compartment, the interior air inlet 24 and the exterior air inlet 26 being selectively openable and closable by a switching damper 28.

In the duct 14, there are disposed an air blower 30 closely to the switching damper 28 and an evaporator 32 positioned downstream of the air blower 30, the evaporator 32 being part of the cooling medium circuit 16. The duct 14 also houses therein a heater core 34 as a heat exchanger disposed downstream of the evaporator 32, the heater core 34 being part of the heating medium circuit 18. The air-mixing unit 20 is mounted on an inlet side of the heater core 34. The air-mixing unit 20 has an air-mixing damper 36 which can be angularly moved to any desired angular position within an angular range from an angular extent 0% to an angular extent 100% by an air-mixing motor 38 coupled to the air-mixing damper 36.

The duct 14 has in its downstream end portion a defrosting outlet 40 for discharging air against the inner surface of a front windshield of the electric vehicle, a face outlet 42 for discharging air against the head of a passenger in the passenger's compartment, and a foot outlet 44 for discharging air against the feet of the passenger. The defrosting outlet 40, the face outlet 42, and the foot outlet 44 are associated respectively with a defrosting damper 46, a face damper 48, and a foot damper 50 which are angularly movable to open and close the defrosting outlet 40, the face outlet 42, and the foot outlet 44, respectively.

These outlets 40, 42, 44 operate selectively in various modes including a "DEF" mode in which the defrosting outlet 40 is selectively opened and closed by the defrosting damper 46, a "FOOT" mode in which the foot outlet 44 is selectively opened and closed by the foot damper 50, a "FOOT/DEF" mode in which the defrosting outlet 40 and the foot outlet 44 are selectively opened and closed by the defrosting damper 46 and the foot damper 50, a "VENT" mode (or "FACE" mode) in which the face outlet 42 is selectively opened and closed by the face damper 48, and a "B/L" mode in which the face outlet 42 and the foot outlet 44 are selectively opened and closed by the face damper 48 and the foot damper 50.

The evaporator 32 serves to evaporate a cooling medium flowing into the evaporator 32 and also to cool air which is introduced into the duct 14 by the air blower 30, through heat exchange between the air and the cooling medium. The cooling medium circuit 16 which includes the evaporator 32 includes a compressor 52 having an inlet port connected to an outlet port of the evaporator 32 by a cooling medium pipe 54a which has an accumulator 56. The compressor 52 compresses the cooling medium (gas coolant), drawn thereinto through the inlet port thereof, and it discharges a high-temperature, high-pressure cooling medium from an outlet port thereof into a cooling medium pipe 54b. The accumulator 56 separates the cooling medium into a liquid coolant and a gas coolant, and it supplies only the gas coolant to the compressor 52.

The cooling medium pipe 54b has an end portion branched into cooling medium pipes 54c, 54d, and the cooling medium pipe 54c is branched into cooling medium pipes 54e, 54f. The cooling medium pipe 54c has a first solenoid-operated valve 58, and the cooling medium pipe 54f has a second solenoid-operated valve 60. The cooling medium pipe 54f is connected to the cooling medium pipe 54a. The cooling medium pipe 54e has an exterior heat exchanger 62 which serves to evaporate a low-temperature, low-pressure cooling medium in a gas-liquid phase through heat exchange between the cooling medium and exterior air applied by an exterior fan 64 when the automatic air-conditioning system 12 operates in a heating mode to heat the passenger's compartment, and also to condense a high-temperature, high-pressure gas coolant into a liquid through heat exchange between the gas coolant and exterior air applied by the exterior fan 64 when the automatic air-conditioning system 12 operates in a cooling mode to cool the passenger's compartment.

The cooling medium pipe 54d has a first capillary tube 68 to be used for heating. The cooling medium pipes 54d, 54e are joined into a cooling medium pipe 54g which is connected to the inlet port of the evaporator 32. In the cooling medium pipe 54g, a third solenoid-operated valve 66 and a second capillary tube 70 used for cooling are provided in parallel to each other.

The heating medium circuit 18 includes a hot-water circulation pipe 72 for circulating and supplying hot water to the heater core 34, the hot-water circulation pipe 72 having a water pump 74 and a fuel-combustion heater 76 for generating heat by combusting a fuel. The fuel-combustion heater 76 is controlled in three modes, i.e., an igniting mode, a combustion ability switching mode (mole of normal heating operation), and an extinguishing mode. The hot-water circulation pipe 72 includes an outer conduit 78 disposed around and extending a certain length along a portion of the cooling medium pipe 54b of the cooling medium circuit 16. The cooling medium pipe 54b and the outer conduit 78 jointly provide a double-walled medium heat exchanger 80. When the high-temperature, high-pressure cooling medium discharged from the compressor 52 flows through the cooling medium pipe 54b, the medium heat exchanger 80 heats hot water flowing as a heating medium in the outer conduit 78 of the hot-water circulation pipe 72 through heat exchange between the heating medium and the cooling medium from the compressor 52.

Figure 2:
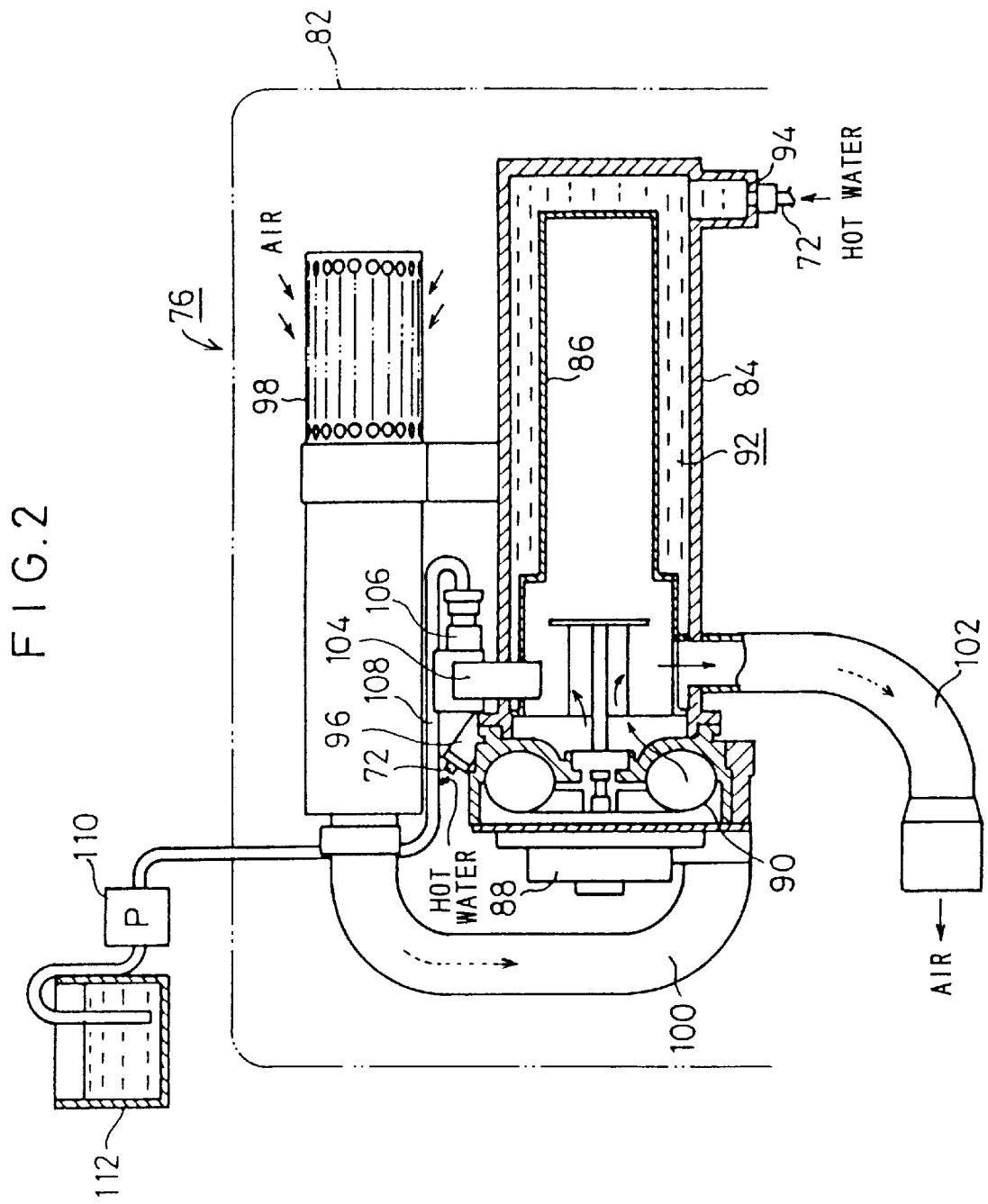
FIG. 2 is a vertical cross-sectional view of a fuel-combustion heater of the automatic air-conditioning system.

As shown in FIG. 2, the fuel-combustion heater 76 comprises a substantially cylindrical heater case 84 housed in a cover 82 and having a closed end. The heater case 84 houses a substantially cylindrical combustion tube 86 disposed coaxially therein and having a closed end. The heater case 84 has an open end on which an air blower 90 coupled to a motor unit 88 is mounted.

Between the heater case 84 and the combustion tube 86, there is defined a heat exchange passage 92 communicating with a hot water inlet port 94 and a hot water outlet port 96 which are defined in the heater case 84. An inlet pipe 100 has an end connected to the air blower 90 and an opposite end connected to a silencer 98. An exhaust pipe 102 for discharging exhaust gases is connected to the heater case 82 near its open end. The hot water inlet port 94 and the hot water outlet port 96 of the heater case 84 are connected to the hot-water circulation pipe 72.

A glow plug 104 for igniting the fuel when the automatic air-conditioning system 12 is started is mounted on the heater case 84 near the air blower 90. The glow plug 104 is connected to a fuel pipe 108 through a one-way valve 106. The fuel pipe 108 is connected to a fuel tank 112 through a fuel pump 110. The fuel tank 112 contains fuel such as kerosene, white gasoline, and gas oil.

As shown in FIG. 1, to the automatic air-conditioning ECU 22, there are connected a vehicle ECU 114, a compressor inverter 116, a fuel-combustion heater ECU 11.8, a defrosting electric heater 120, an environmental condition input unit 122, and an operating condition input unit 124. The vehicle ECU 114 and the compressor inverter 116 are supplied with electric energy from a battery 126, and the compressor inverter 116 is connected to the compressor 52.

The environmental condition input unit 122 includes an ambient air temperature sensor 128 for detecting an ambient air temperature $T_{AM}$, a passenger's compartment temperature sensor 130 for detecting a passenger's compartment temperature $T_R$, and a sunlight intensity sensor 132 for detecting a sunlight intensity $T_S$ (kcal/h·m$^2$). The operating condition input unit 124 includes a water temperature sensor 134 for detecting the temperature $T_W$ of hot water flowing through the heater core 34, an air temperature sensor 136 for detecting the temperature $T_E$ of air discharged from the evaporator 32, a pressure sensor 138 for detecting the pressure of the cooling medium discharged from the compressor 52, a current sensor 140 for detecting a current from the battery 126, and a cooling medium temperature sensor 142 for detecting the temperature of the cooling medium near the exterior heat exchanger 62.

Basically, the automatic air-conditioning ECU 22 can perform a function as a calculating means for calculating a target discharged-air temperature $T_{AO}$ based on inputted environmental conditions including the passenger's compartment temperature $T_R$ and ambient air temperature $T_{AM}$, and a desired temperature setting $T_{SET}$, a function as an operation mode selecting means for selecting one of operation modes including a cooling mode, an air blowing mode, and a heating mode based on the ambient air temperature $T_{AM}$, a function to control the discharged-air temperature based on the target discharged-air temperature $T_{AC}$, and a function to control the various components included in the entire automatic air-conditioning system 12.

Figure 3:
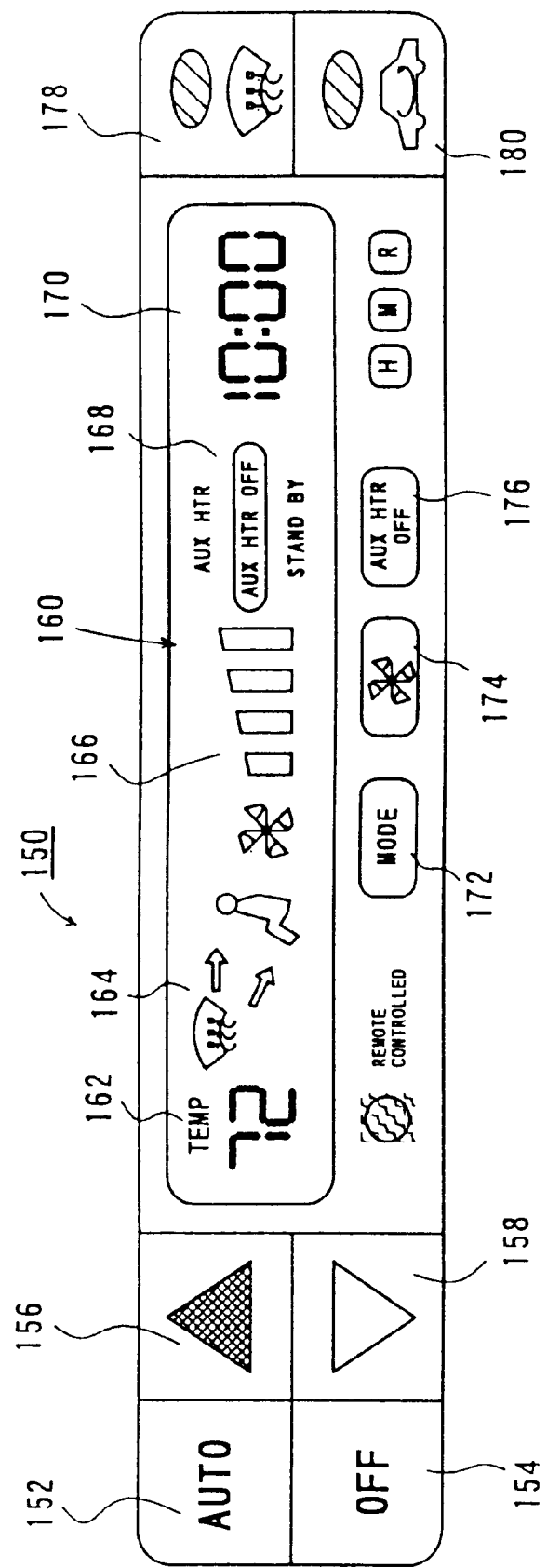
FIG. 3 is a front elevational view of a control panel of the automatic air-conditioning system.

To the automatic air-conditioning ECU 22, there is connected a control panel 150 which, as shown in FIG. 3, has an "AUTO" switch 152 for starting to energize the automatic air-conditioning system 12, an "OFF" switch 154 for turning off the entire operation of the automatic air-conditioning system 12, and temperature increasing and lowering switches 156, 158 disposed respectively adjacent to the "AUTO" switch 152 and the "OFF" switch 154 which are disposed at upper and lower positions at the left end of the control panel 150 as shown in FIG. 3.

The control panel 150 also has a longitudinally elongate display unit 160 disposed substantially centrally therein. The display unit 160 includes a temperature display area 162, an outlet mode display area 164, an air flow intensity display area 166, a fuel-combustion heater status display area 168, and a time display area 170. The fuel-combustion heater status display area 168 includes a display message "STAND BY" indicating that the fuel-combustion heater 76 is in the igniting mode or the extinguishing mode other than the combustion ability switching mode.

The control panel 150 also has, beneath the display unit 160, an outlet mode selector switch 172, an air flow intensity selector switch 174, and a fuel-combustion heater manual stop switch 176. The control panel 150 further includes a defrosting switch 178 and an air circulation/introduction selector switch 180 which are disposed at upper and lower positions at the right end of the control panel 150.

Figure 4:
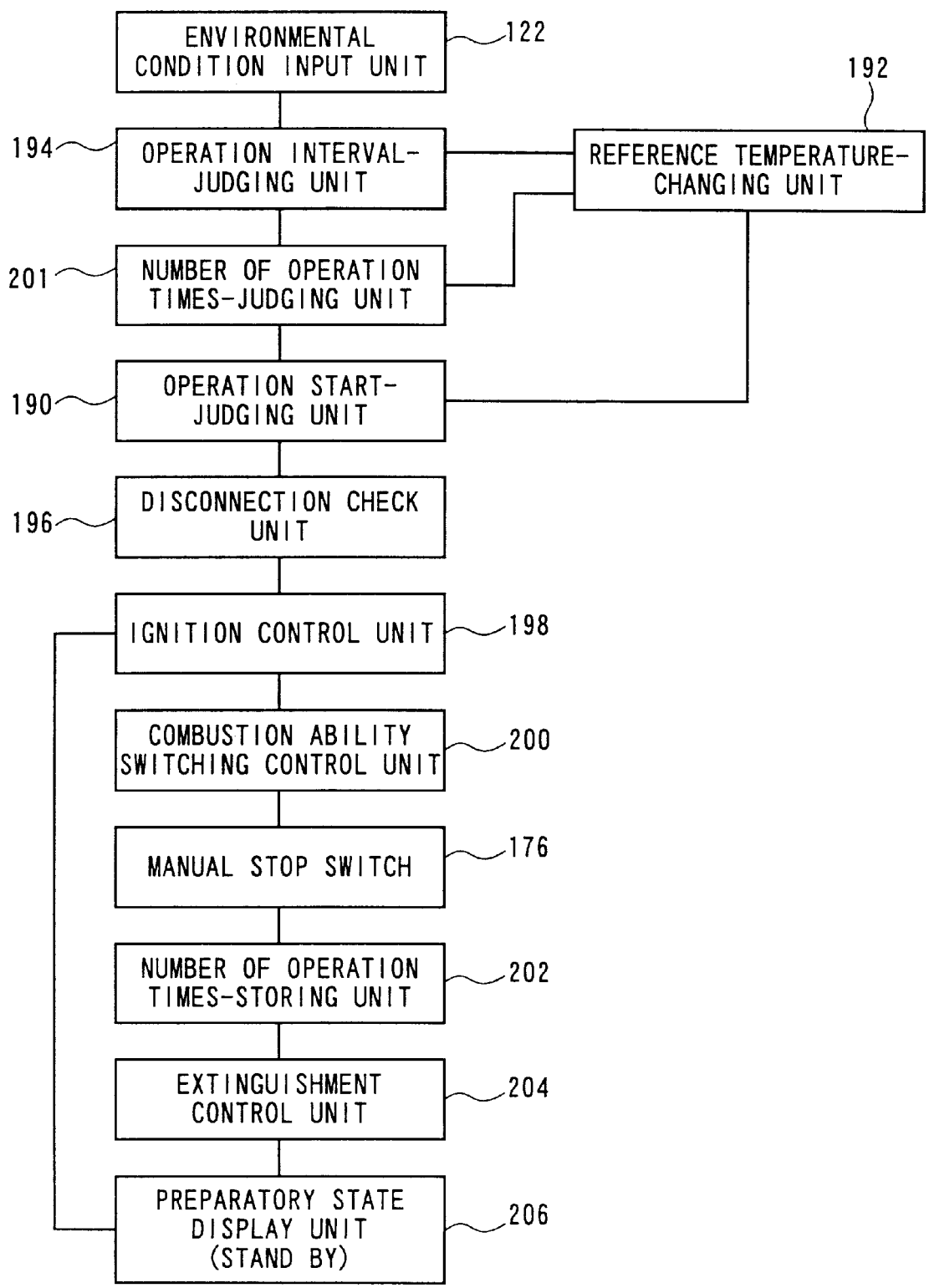
FIG. 4 is a block diagram illustrative of the control apparatus.

As shown in FIG. 4, the control apparatus 10 according to the embodiment of the present invention comprises the environmental condition input unit 122 for inputting the environmental conditions including the ambient air temperature $T_{AM}$, an operation start-judging unit 190 for judging whether or not the inputted ambient air temperature $T_{AM}$ is lower than a previously set first reference temperature to start operation of the fuel-combustion heater 76 when the ambient air temperature $T_{AM}$ is lower than the first reference temperature, and a reference temperature-changing unit 192 for setting, for the first reference temperature, a second reference temperature which is lower than the first reference temperature when the fuel-combustion heater 76 is operated for the second time or later. These functions are basically included in the function of the automatic air-conditioning ECU 22.

The control apparatus 10 further comprises an operation interval-judging unit 194 for judging whether or not each of the operation intervals is within a predetermined period of time (for example, 3 minutes) when the fuel-combustion heater 76 is operated for the second time or later. When it is judged by the operation interval-judging unit 194 that the operation interval is within the predetermined period of time, the reference temperature-changing unit 192 sets, for the first reference temperature, the second reference temperature which is lower than the first reference temperature.

The operation start-judging unit 190 is connected to an ignition control unit 198 through a disconnection check unit 196. The disconnection check unit 196 checks electric disconnection for the fuel-combustion heater ECU 118. The ignition control unit 198 actuates the glow plug 104 of the fuel-combustion heater 76. After the fuel is ignited by the glow plug 104, the combustion ability is switched and controlled by a combustion ability switching control unit 200. In the combustion ability switching control, the degree of combustion effected by the fuel-combustion heater 76 is controlled continuously or in a stepless manner, for example, in a range of 3000 kcal/h to 6000 kcal/h.

The manual stop switch 176 is provided to switch off the fuel-combustion heater 76 by means of manual operation. The number of operation times of the manual stop switch 176 is detected by a number of operation times-judging unit 201 and stored in a number of operation times-storing unit 202. When the manual stop switch 176 is operated once or more, the reference temperature-changing unit 192 sets, for the first reference temperature, the second reference temperature which is lower than the first reference temperature. When the manual stop switch 176 is pressed, the fuel-combustion heater 76 is subjected to extinguishment control by the aid of an extinguishment control unit 204. The extinguishment control status and the ignition control state effected by the ignition control unit 198 are displayed by lighting "STAND BY" by the aid of a preparatory state display unit 206.

Operation of the automatic air-conditioning system 12 to which the control apparatus 10 constructed as described above is applied will be described below.

Figure 5:
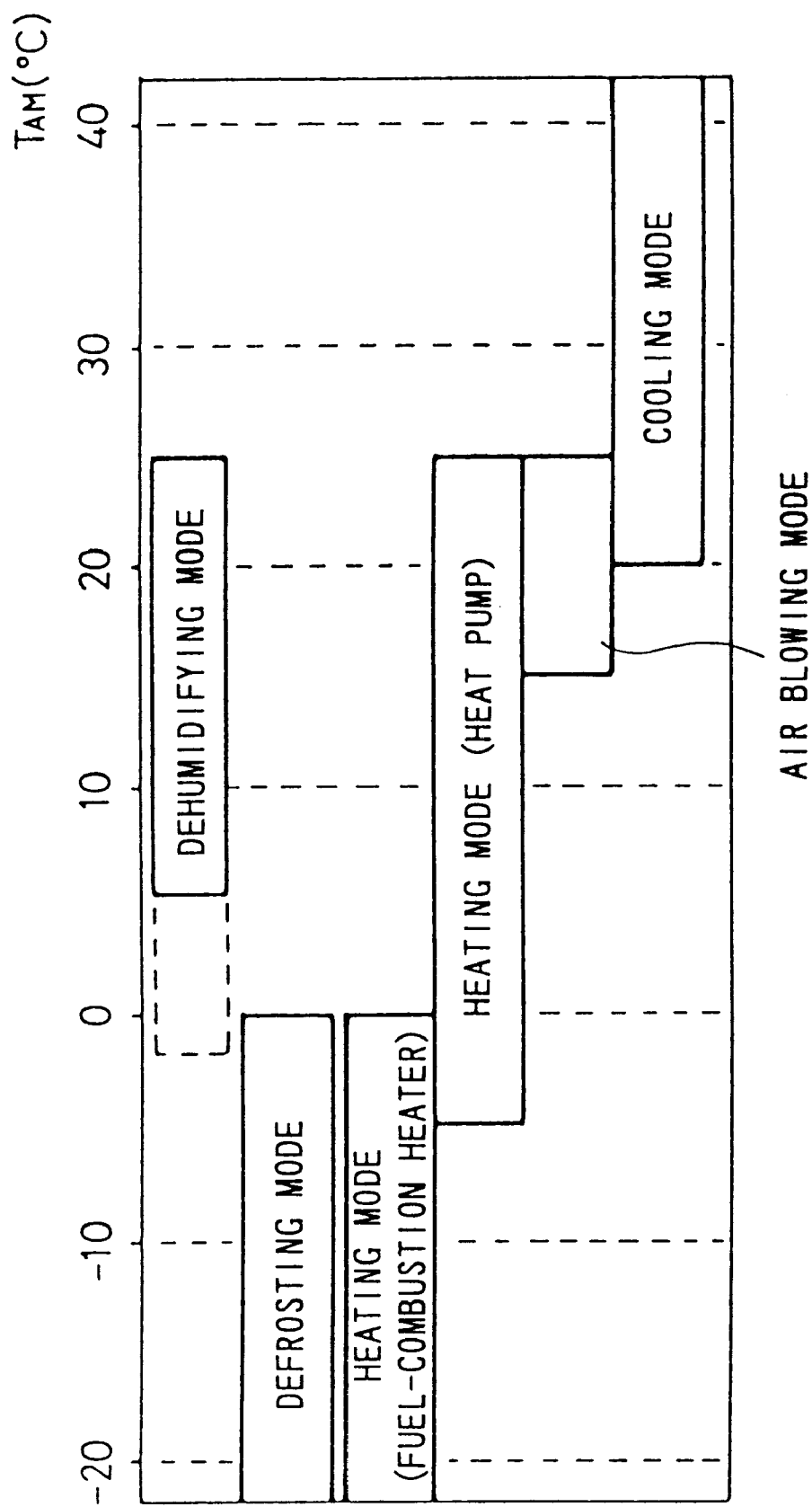
FIG. 5 is a diagram showing the relationship between various modes of operation of the automatic air-conditioning system and temperature ranges for the respective modes of operation.

The states of various components of the cooling medium circuit 16 when the automatic air-conditioning system 12 is in a cooling mode, a heating mode (carried out by a heat pump), a heating mode (carried out by the fuel-combustion heater), a dehumidifying mode, and an air blowing mode are shown in Table 1 given below, and the relationship between these modes of operation of the automatic air-conditioning system 12 and ambient air temperature $T_{AM}$ ranges for the respective modes of operation are shown in FIG. 5.

TABLE 1

| Mode of operation | Cooling | Heating *1 | Heating *2 | Dehumidifying | Air blowing |
|---|---|---|---|---|---|
| Solenoid-operated valve 58 | Open | Closed | Closed | Closed | Closed |
| Solenoid-operated valve 60 | Closed | Open | Closed | Closed | Closed |
| Solenoid-operated valve 66 | Closed | Closed | Closed | Open | Closed |
| Capillary tube 68 | — | Through | — | Through | — |
| Exterior heat exchanger 62 | Through | Through | — | — | — |
| Capillary tube 70 | Through | — | — | — | — |
| Evaporator 32 | Through | — | — | Through | — |
| Water pump 74 | Off | On | On | On | Off |
| Compressor 52 | On | On | Off | On | Off |

*1: Heat pump
*2: Fuel-combustion heater

Figure 6:
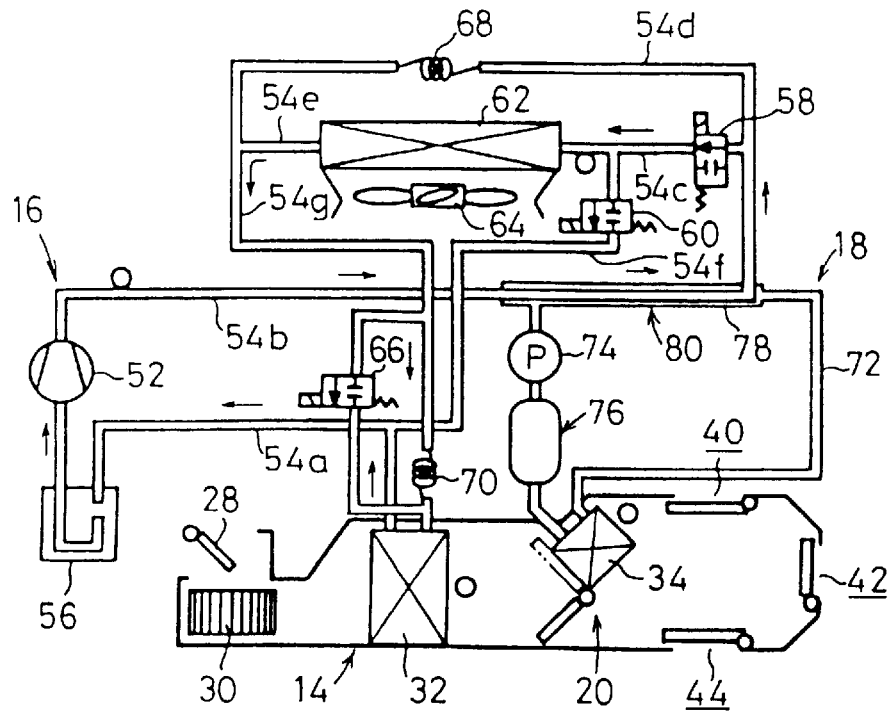
FIG. 6 is a schematic view illustrative of a cooling mode of the automatic air-conditioning system.

In the cooling mode, as shown in Table 1 and FIG. 6, the first solenoid-operated valve 58 is open and the second and third solenoid-operated valves 60, 66 are closed. Therefore, the cooling medium discharged from the compressor 52 flows through the cooling medium pipes 54b, 54c, the first solenoid-operated valve 58, the exterior heat exchanger 62, and the cooling medium pipe 54b into the second capillary tube 70, and then it flows through the evaporator 32 into the cooling medium pipe 54a, from which the cooling medium flows through the accumulator 56 back to the compressor 52.

Therefore, the high-temperature, high-pressure gas coolant discharged from the compressor 52 is turned to a liquid when the heat thereof is radiated by the exterior heat exchanger 62. The liquid coolant then flows through the second capillary tube 70 in which its pressure is reduced to produce a cooling medium in a gas-liquid phase. This cooling medium is evaporated in the evaporator 32 thereby to cool air that passes through the evaporator 32.

Figure 7:
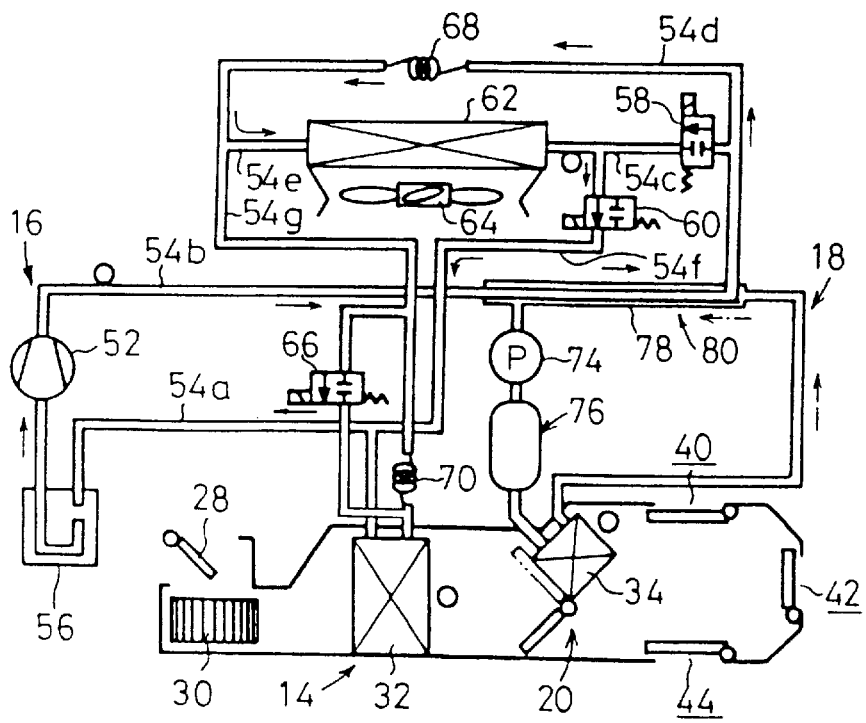
FIG. 7 is a schematic view illustrative of a heating mode (carried out by a heat pump) of the automatic air-conditioning system.

In the heating mode (carried out by a heat pump), as shown in Table 1 and FIG. 7, the first and third solenoid-operated valves 58, 66 are closed, and the second solenoid-operated valve 60 is open. Therefore, the cooling medium discharged from the compressor 52 flows through the cooling medium pipes 54b, 54d into the first capillary tube 68 in which its pressure is reduced to produce a cooling medium in a gas-liquid phase. The cooling medium passes through the exterior heat exchanger 62 and is evaporated, after which the cooling medium passes through the second solenoid-operated valve 60 and the cooling medium pipes 54f, 54a into the accumulator 56, from which the cooling medium flows back to the compressor 52.

In the heating medium circuit 18, the outer conduit 78 of the double-walled medium heat exchanger 80 is supplied with hot water. Consequently, when the high-temperature, high-pressure cooling medium flows through the cooling medium pipe 54b internally with respect to the outer conduit 78, it heats the hot water in the outer conduit 78. The heated hot water is introduced by the water pump 74 into the heater core 34 for thereby heating air that passes through the heater core 34 to a certain temperature.

Figure 8:
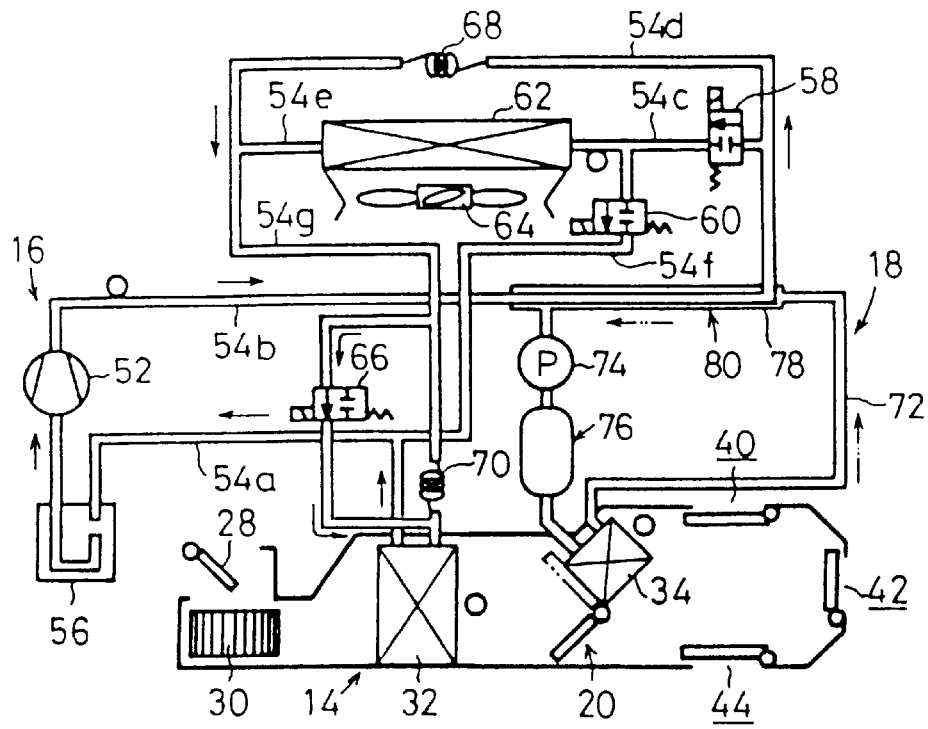
FIG. 8 is a schematic view illustrative of a dehumidifying mode of the automatic air-conditioning system.

In the dehumidifying mode, as shown in Table 1 and FIG. 8, the first and second solenoid-operated valves 58, 60 are closed, and the third solenoid-operated valve 66 is open. Therefore, the cooling medium discharged from the compressor 52 flows through the cooling medium pipes 54b, 54d, the first capillary tube 68, and the cooling medium pipe 54g into the third solenoid-operated valve 66. In the first capillary tube 68, the pressure of a cooling medium is reduced so that it is in a gas-liquid phase. The cooling medium then flows to the evaporator 32, it dehumidifies air that passes through the evaporator 32, and thereafter it flows from the cooling medium pipe 54a through the accumulator 56 back to the compressor 52.

Figure 9:
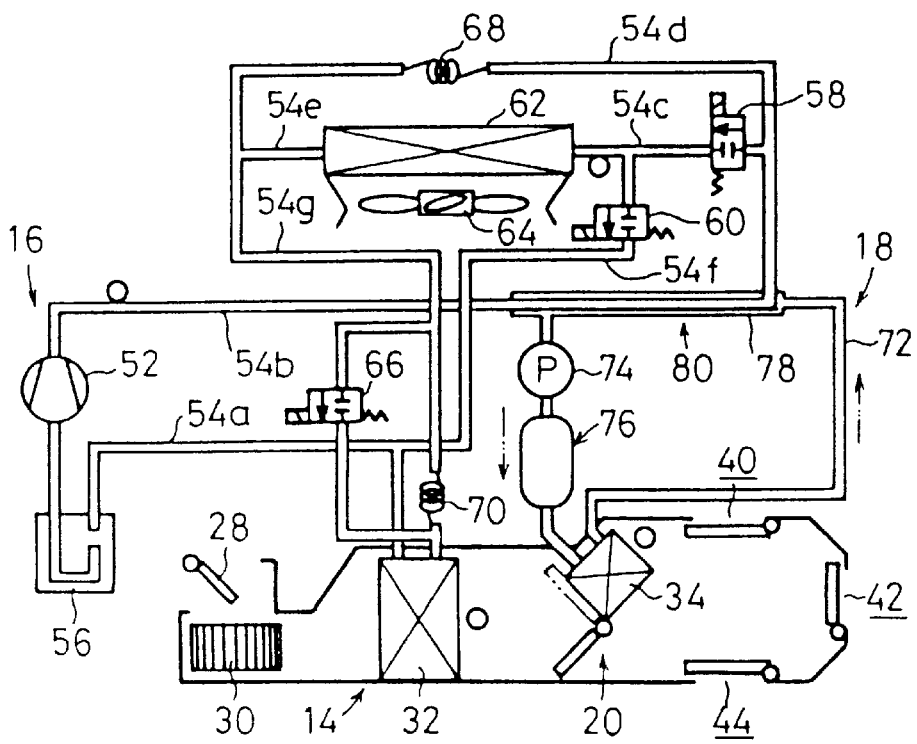
FIG. 9 is a schematic view illustrative of a heating mode (carried out by a fuel-combustion heater) of the automatic air-conditioning system.

In the heating mode (carried out by the fuel-combustion heater), as shown in Table 1 and FIG. 9, the first, second, and third solenoid-operated valves 58, 60, 66 are closed, and the compressor 52 is turned off, so that the automatic air-conditioning system 12 is not operating in an automatic air-conditioning cycle.

The fuel-combustion heater 76 is actuated. As shown in FIG. 2, the air blower 90 is rotated by the motor unit 88, and the fuel pump 110 is operated to supply the fuel (kerosene, white gasoline, gas oil, or the like) from the fuel tank 112 through the fuel pipe 108 and the one-way valve 106 to the combustion tube 86. The glow plug 104 is energized to ignite the supplied fuel which is combusted together with air that is supplied from the silencer 98 through the inlet pipe 100 by the air blower 90.

The heat exchange passage 92 in the heater case 84 is supplied with hot water from the hot-water circulation pipe 72 through the hot water inlet port 94. The supplied hot water is heated by heat exchange between itself and exhaust gases flowing through the combustion tube 86, and it flows back from the hot water outlet port 96 to the hot-water circulation pipe 72. The hot water heated by the fuel-combustion heater 76 is introduced into the heater core 34, and it heats air passing through the heater core 34 to a certain temperature. After the heat exchange, the exhaust gases are discharged from the combustion tube 86 through the exhaust pipe 102.

In the air blowing mode, the first, second, and third solenoid-operated valves 58, 60, 66 are closed, and the water pump 74 is turned off, as shown in FIG. 1.

Figure 10:
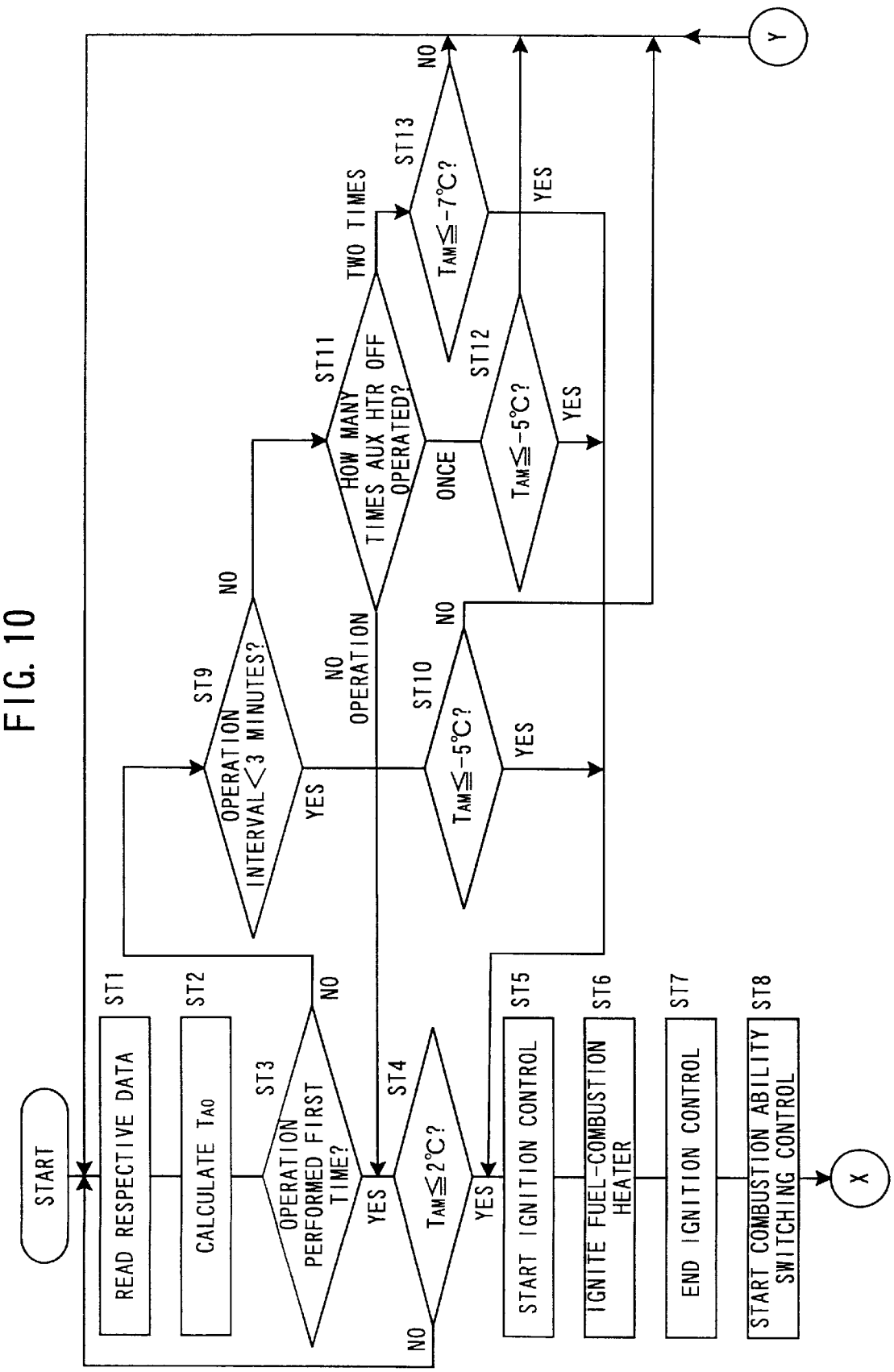
FIG. 10 is a former part of a flow chart illustrative of a control method according to the present invention.
Figure 11:
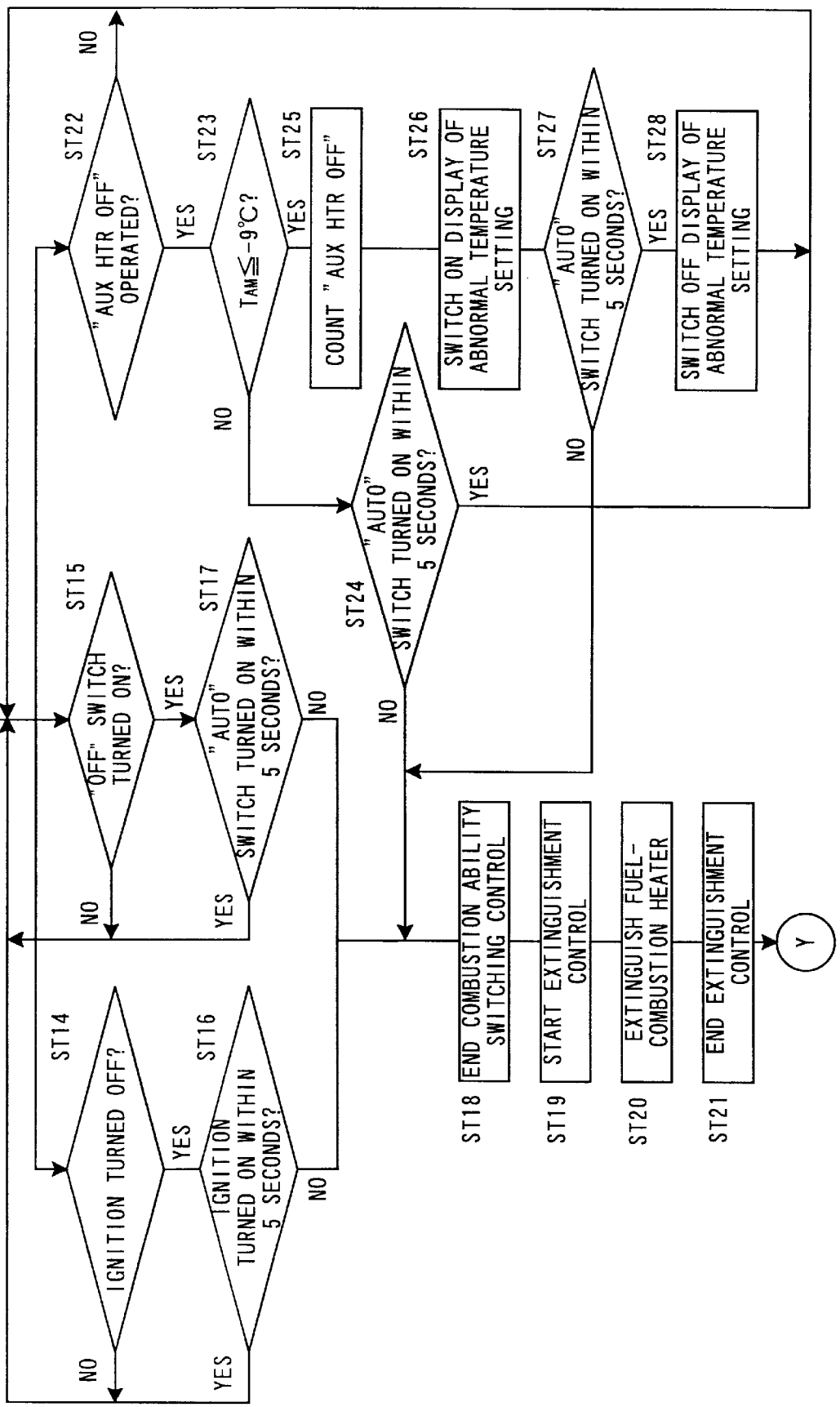
FIG. 11 is a latter part of the flow chart.

The control method according to the present invention will be described below with reference to a flow chart shown in FIGS. 10 and 11.

When the ignition is turned on, and thereafter the "AUTO" switch 152 on the control panel 150 is turned on, then the automatic air-conditioning ECU 22 reads signals from the ambient air temperature sensor 128, the passenger's compartment temperature sensor 130, and the sunlight intensity sensor 132 of the environmental condition input unit 122 and also signals from the water temperature sensor 134, the air temperature sensor 136, the pressure sensor 138, the current sensor 140, and the cooling medium temperature sensor 142 of the operating condition input unit 124. The automatic air-conditioning ECU 22 also reads a desired temperature setting $T_{SET}$ which has been entered by the passenger by manually pressing the temperature increasing and lowering switches 156, 158 (step ST1 in FIG. 10).

Based on the desired temperature setting $T_{SET}$, and the parameters detected by the environmental condition input unit 122, i.e., the ambient air temperature $T_{AM}$ detected by the ambient air temperature sensor 128, the passenger's compartment temperature $T_R$ detected by the passenger's compartment temperature sensor 130, and the sunlight intensity $T_S$ detected by the sunlight intensity sensor 132, the automatic air-conditioning ECU 22 calculates a target discharged-air temperature $T_{AO}$ for the air to be discharged into the passenger's compartment according to the following equation (1) (step ST2):

$$T_{AO}=K_{SET} \times T_{SET} - K_R \times T_R - K_{AM} \times T_{AM} - K_s \times T_S - C \tag{1}$$

where $K_{SET}$, $K_R$, $K_{AM}$, $K_S$ represent coefficients (gains) and C a constant.

Figure 12A:
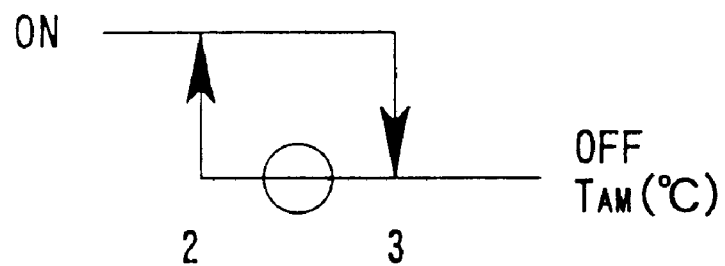
FIG. 12A is a diagram illustrative of a first reference temperature.

When the fuel-combustion heater 76 is operated for the first time (YES in a step ST3) the routine proceeds to a step ST4 to compare the inputted ambient air temperature $T_{AM}$ with the first reference temperature (for example, 2° C.). As shown in FIG. 12A, if the ambient air temperature $T_{AM}$ is not more than 2° C. (YES in the step ST4), the ignition control is started by the aid of the ignition control unit 198 (step ST5).

As described above with reference to FIG. 2, the ignition control is effected to automatically ignite the fuel by the aid of the glow plug 104 (step ST6 and step ST7). The routine subsequently proceeds to a step ST8 to start the combustion ability switching control. In the combustion ability switching control, the degree of combustion effected by the fuel-combustion heater 76 is controlled continuously or in a stepless manner, for example, in a range of 3000 kcal/h to 6000 kcal/h. Accordingly, the passenger's compartment is heated to a predetermined temperature. The heating operation control is continuously performed during the air-conditioning.

On the other hand, if it is judged in the step ST3 that the fuel-combustion heater 76 is operated for the second time or later (NO in the step ST3), the routine proceeds to a step ST9 to judge whether or not each of the operation intervals is within a predetermined period of time (for example, 3 minutes). If it is judged that the operation interval is within 3 minutes (YES in the step ST9), the second reference temperature (for example, −5° C.), which is lower than the first reference temperature (2° C.), is set. It is judged whether or not the ambient air temperature $T_{AM}$ is lower than the second reference temperature (−5° C.) (step ST10).

Figure 12B:
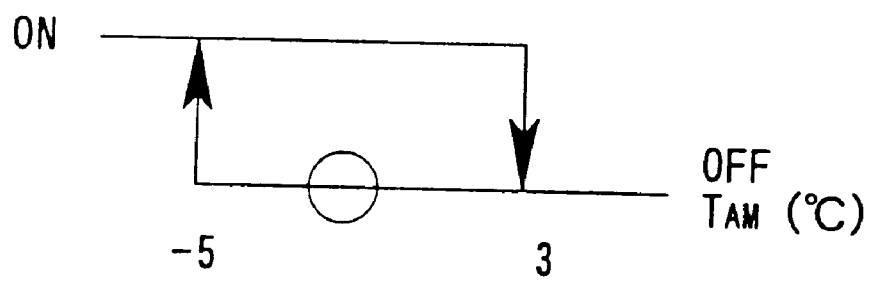
FIG. 12B is a diagram illustrative of a second reference temperature.

As shown in FIG. 12B, if the ambient air temperature $T_{AM}$ is not more than −5° C. (YES in the step ST10), the routine proceeds to the step ST5 to start the ignition control. If the ambient air temperature $T_{AM}$ is not less than −5° C., then the routine returns to the step ST1, and the fuel-combustion heater 76 is not operated. If it is judged in the step ST9 that the operation interval is not less than 3 minutes (NO in the step ST9), the routine proceeds to a step ST11 to judge how many times the manual stop switch 176 has been operated.

Figure 12C:
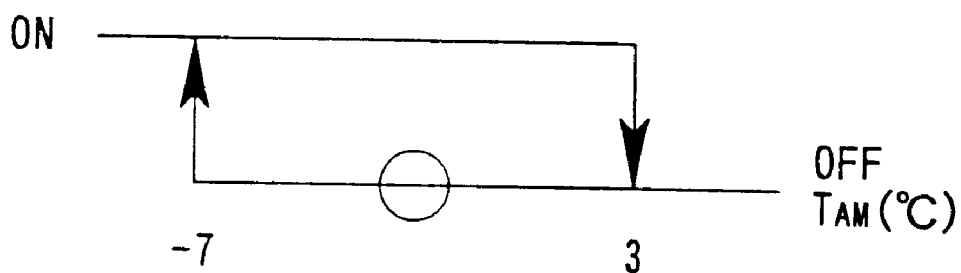
FIG. 12C is a diagram illustrative of a third reference temperature.

If the operation of the manual stop switch 176 is not performed, the routine proceeds to the step ST4 to compare the ambient air temperature $T_{AM}$ with the first reference temperature (2° C.). If the manual stop switch 176 is operated once, the routine proceeds to a step ST12 to compare the ambient air temperature $T_{AM}$ with the second reference temperature (−5° C.). If the manual stop switch 176 is operated two times, the routine proceeds to a step ST13 to compare the ambient air temperature $T_{AM}$ with the third reference temperature (−7° C.) which is lower than the second reference temperature (see FIG. 12C).

If it is judged in the step ST12 and the step ST13 that the ambient air temperature TM is lower than the second and third reference temperatures respectively, the routine proceeds to the step ST5 to start the ignition control. On the other hand, if it is judged that the ambient air temperature $T_{AM}$ is higher than the second and third reference temperatures respectively, the routine returns to the step ST1.

As described above, in the embodiment of the present invention, when the fuel-combustion heater 76 is operated for the first time, if it is judged that the inputted ambient air temperature $T_{AM}$ is lower than the previously entered first reference temperature (2° C.), then the fuel-combustion heater 76 is operated. On the other hand, if the fuel-combustion heater 76 is operated for the second time or later, the routine proceeds to the step ST9 to judge whether or not each of the operation intervals is within the predetermined period of time (3 minutes). If the operation time is within the predetermined period of time, the second reference temperature (−5° C.), which is lower than the first reference temperature (2° C.), is set (see FIGS. 12A and 12B).

Therefore, the ambient air temperature setting $T_{AM}$ for operating the fuel-combustion heater 76 is automatically changed from 2° C. to −5° C. Thus, it is possible to reliably prevent the fuel-combustion heater 76 from frequent on/off operation. Therefore, it is possible to greatly reduce the frequency of occurrence of the operation sound upon the start and the extinguishment, which would be otherwise caused by frequent on/off operation of the fuel-combustion heater 76. Further, it is possible to reduce production of unburned gas as less as possible. Moreover, the glow plug 104 is not actuated frequently, and hence it is possible to effectively use the glow plug 104 for a long period of time.

In the embodiment of the present invention, the number of operation times of the manual stop switch 176 is detected in the step ST11, and the first reference temperature (2° C.), the second reference temperature (−5° C.), and the third reference temperature (−7° C.) are set depending on the number of operation times. The first to third reference temperatures are compared with the ambient air temperature $T_{AM}$ (see FIGS. 12A to 12C). Therefore, the operation to start the fuel-combustion heater 76 can be controlled by using the ambient air temperature $T_{AM}$ to which the intention of the passenger is reflected.

The fuel-combustion heater 76 can be switched off in accordance with the intention of the passenger. The present invention is advantageous in that it is possible to drive the vehicle in conformity with the regulation of zero-emission, and the pollution of air can be avoided, which would be otherwise caused in the garage due to the exhaust gas discharged from the fuel-combustion heater 76. When the fuel-combustion heater 76 is switched off, the heating operation is effected by using the heat pump. Therefore, it is possible to effectively maintain the air-conditioned state in the passenger's compartment.

When the ignition is turned off, or the "OFF" switch 154 is turned on (step ST14 or step ST15) after the start of the combustion ability switching control, if the ignition or the "AUTO" switch 152 is not turned on within a predetermined period of time (for example, 5 seconds) (NO in a step ST16 and a step ST17), then the routine proceeds to a step ST18 to end the combustion ability switching control. Subsequently, the extinguishment control is started by the aid of the extinguishment control means 204. The fuel-combustion heater 76 is extinguished, and the extinguishment control is ended (step ST19 to step ST21).

On the other hand, when the manual stop switch 176 is pressed after the start of the combustion ability switching control (YES in a step ST22), the ambient air temperature $T_{AM}$ is compared with the fourth reference temperature (for example, −9° C.) (step ST23). If the ambient air temperature $T_{AM}$ is not less than −9° C. (NO in the step ST23), the routine proceeds to a step ST24 to judge whether or not the "AUTO" switch 152 is turned on within 5 seconds. If the "AUTO" switch 152 is not turned on within 5 seconds, the routine proceeds to the step ST18 to end the combustion ability switching control. On the other hand, if the "AUTO" switch 152 is turned on within 5 seconds, the combustion ability switching control is continued.

If it is judged in the step ST23 that the ambient air temperature $T_{AM}$ is not more than −9° C., the routine proceeds to a step ST25 to count the number of operation times of the manual step switch 176. Subsequently, the routine proceeds to a step ST26 to switch on the display of abnormal temperature setting. After that, if the "AUTO" switch 152 is turned on within 5 seconds (YES in a step ST27), the display of abnormal temperature setting is switched off to continue the combustion ability switching control (step ST28). On the other hand, if the "AUTO" switch 152 is not turned on within 5 seconds, the routine proceeds to the step ST18 to end the combustion ability switching control.

As described above, in the method and the apparatus for controlling the vehicular fuel-combustion heater according to the present invention, when the fuel-combustion heater is operated for the first time, if it is judged that the inputted ambient air temperature is lower than the previously set first reference temperature, then the fuel-combustion heater is operated. If the fuel-combustion heater is operated for the second time or later, the second reference temperature, which is lower than the first reference temperature, is set. If it is judged that the inputted ambient air temperature is lower than the second reference temperature, the operation of the fuel-combustion heater is started. Therefore, the on/off operation for the fuel-combustion heater is not performed frequently. The operation sound upon the start of operation and the extinguishment, which would be otherwise caused when the fuel-combustion heater is turn on and off, can be effectively eliminated further, the present invention makes it possible to prolong the service life of components and parts such as an ignition plug.

What is claimed is:

1. A method for controlling a vehicular fuel-combustion heater for heating a heating medium with combustion heat generated thereby, the fuel-combustion heater being incorporated into a heating medium circuit for heating air by means of heat exchange effected between said heating medium and said air flowing through a duct including a heat exchanger disposed therein and having an air outlet which is openable into a passenger's compartment, said method comprising the steps of:

inputting environmental conditions including an ambient air temperature;

judging whether or not said inputted ambient air temperature is lower than a previously set first reference temperature when said fuel-combustion heater is operated for the first time;

starting operation of said fuel-combustion heater when it is judged that said inputted ambient air temperature is lower than said first reference temperature;

setting a second reference temperature which is lower than said first reference temperature when said fuel-combustion heater is operated for the second time or later; and starting operation of said fuel-combustion heater when it is judged that said inputted ambient air temperature is lower than said second reference temperature.

2. The method according to claim 1, wherein said operation of said fuel-combustion heater is stopped automatically.

3. The method according to claim 1, wherein said operation of said fuel-combustion heater is stopped in accordance with manual operation.

4. The method according to claim 1, wherein said operation of said fuel-combustion heater is stopped automatically or in accordance with manual operation.

5. A method for controlling a vehicular fuel-combustion heater for heating a heating medium with combustion heat generated thereby, the fuel-combustion heater being incorporated into a heating medium circuit for heating air by means of heat exchange effected between said heating medium and said air flowing through a duct including a heat exchanger disposed therein and having an air outlet which is openable into a passenger's compartment, said method comprising the steps of:

inputting environmental conditions including an ambient air temperature;

judging whether or not said inputted ambient air temperature is lower than a previously set first reference temperature when said fuel-combustion heater is operated for the first time;

starting operation of said fuel-combustion heater when it is judged that said inputted ambient air temperature is lower than said first reference temperature;

judging whether or not each of operation intervals is within a predetermined period of time when said fuel-combustion heater is operated for the second time or later;

setting a second reference temperature which is lower than said first reference temperature when it is judged that said operation interval is within said predetermined period of time; and starting operation of said fuel-combustion heater when it is judged that said inputted ambient air temperature is lower than said second reference temperature.

6. The method according to claim 5, further comprising the steps of:

detecting a number of times of operation of a manual stop switch for stopping said fuel-combustion heater by means of manual operation when it is judged that said operation interval is without said predetermined period of time;

setting said second reference temperature which is lower than said first reference temperature when said manual stop switch is operated once or more; and starting operation of said fuel-combustion heater when it is judged that said inputted ambient temperature is lower than said second reference temperature.

7. The method according to claim 6, further comprising the steps of:

setting an (N+1)th reference temperature which is lower than an Nth reference temperature, when said number of operation times of said manual stop switch is increased from N to N+1 wherein N is a positive integer; and starting operation of said fuel-combustion heater when it is judged that said inputted ambient air temperature is lower than said (N+1)th reference temperature.

8. A method for controlling a vehicular fuel-combustion heater for heating a heating medium with combustion heat generated thereby, the fuel-combustion heater being incorporated into a heating medium circuit for heating air by means of heat exchange effected between said heating medium and said air flowing through a duct including a heat exchanger disposed therein and having an air outlet which is openable into a passenger's compartment, said method comprising the steps of:

- inputting environmental conditions including an ambient air temperature;
- detecting a number of operation times of a manual stop switch for stopping said fuel-combustion heater by means of manual operation;
- judging whether or not said inputted ambient air temperature is lower than a previously set first reference temperature when said manual step switch is not operated at all;
- starting operation of said fuel-combustion heater when it is judged that said ambient air temperature is lower than said first reference temperature;
- setting a second reference temperature which is lower than said first reference temperature when said manual stop switch is operated once or more;
- judging whether or not said inputted ambient air temperature is lower than said second reference temperature; and
- starting operation of said fuel-combustion heater when it is judged that said ambient air temperature is lower than said second reference temperature.

9. The method according to claim 8, further comprising the steps of:

- setting an (N+1)th reference temperature which is lower than an Nth reference temperature, when said number of operation times of said manual stop switch is increased from N to N+1 wherein N is a positive integer; and
- starting operation of said fuel-combustion heater when it is judged that said inputted ambient air temperature is lower than said (N+1)th reference temperature.

10. An apparatus for controlling a vehicular fuel-combustion heater for heating a heating medium with combustion heat generated thereby, the fuel-combustion heater being incorporated into a heating medium circuit for heating air by means of heat exchange effected between said heating medium and said air flowing through a duct including a heat exchanger disposed therein and having an air outlet which is openable into a passenger's compartment, said apparatus comprising:

- an environmental condition input unit for inputting environmental conditions including an ambient air temperature;
- an operation start-judging unit for judging whether or not said inputted ambient air temperature is lower than a previously set first reference temperature, and starting operation of said fuel-combustion heater when said inputted ambient air temperature is lower than said first reference temperature; and
- a reference temperature-changing unit for setting, for said first reference temperature, a second reference temperature which is lower than said first reference temperature when said fuel-combustion heater is operated for the second time or later.

11. The apparatus according to claim 10, further comprising:

- a manual stop switch for stopping said fuel-combustion heater by means of manual operation; and
- a number of operation times-judging unit for detecting a number of times of operation of said manual stop switch when it is judged that said operation interval is without said predetermined period of time, wherein:
- said reference temperature-changing unit sets, for said first reference temperature, said second reference temperature which is lower than said first reference temperature when said manual stop switch is operated once or more.

12. An apparatus for controlling a vehicular fuel-combustion heater for heating a heating medium with combustion heat generated thereby, the fuel-combustion heater being incorporated into a heating medium circuit for heating air by means of heat exchange effected between said heating medium and said air flowing through a duct including a heat exchanger disposed therein and having an air outlet which is openable into a passenger's compartment, said apparatus comprising:

- an environmental condition input unit for inputting environmental conditions including an ambient air temperature;
- an operation start-judging means for judging whether or not said inputted ambient air temperature is lower than a previously set first reference temperature, and starting operation of said fuel-combustion heater when said inputted ambient air temperature is lower than said first reference temperature;
- an operation interval-judging unit for judging whether or not each of operation intervals is within a predetermined period of time when said fuel-combustion heater is operated for the second time or later; and
- a reference temperature-changing unit for setting, for said first reference temperature, a second reference temperature which is lower than said first reference temperature when it is judged that said operation interval is within said predetermined period of time.

13. The apparatus according to claim 12, further comprising:

- a manual stop switch for stopping said fuel-combustion heater by means of manual operation; and
- a number of operation times-judging unit for detecting a number of times of operation of said manual stop switch when it is judged that said operation interval is without said predetermined period of time, wherein:
- said reference temperature-changing unit sets, for said first reference temperature, said second reference temperature which is lower than said first reference temperature when said manual stop switch is operated once or more.

14. An apparatus for controlling a vehicular fuel-combustion heater for heating a heating medium with combustion heat generated thereby, the fuel-combustion heater being incorporated into a heating medium circuit for heating air by means of heat exchange effected between said heating medium and said air flowing through a duct including a heat exchanger disposed therein and having an air outlet which is openable into a passenger's compartment, said apparatus comprising:

- an environmental condition input unit for inputting environmental conditions including an ambient air temperature;
- a manual stop switch for stopping said fuel-combustion heater by means of manual operation;
- a number of operation times-judging unit for detecting a number of operation times of said manual stop switch;
- an operation start-judging unit for judging whether or not said inputted ambient air temperature is lower than a previously set first reference temperature when said manual step switch is operated for the first time, and starting operation of said fuel-combustion heater when said ambient air temperature is lower than said first reference temperature; and a reference temperature-changing unit for setting, for said first reference temperature, a second reference temperature which is lower than said first reference temperature when said manual stop switch is operated for the second time or later.

* * * * *